United States Patent
Banerjee (10) Patent No.: US 10,077,980 B2
(45) Date of Patent: Sep. 18, 2018

(54) METHOD AND CONTROL UNIT FOR DETERMINING AN ANGLE BETWEEN LONGITUDINAL AXES OF COMPONENT VEHICLES OF A TRACTOR-TRAILER COMBINATION

(71) Applicant: ZF Friedrichshafen AG, Friedrichshafen (DE)

(72) Inventor: Alexander Banerjee, Oberteuringen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 217 days.

(21) Appl. No.: 14/792,676

(22) Filed: Jul. 7, 2015

(65) Prior Publication Data
US 2016/0018220 A1    Jan. 21, 2016

(30) Foreign Application Priority Data
Jul. 21, 2014  (DE) .......................... 10 2014 214 141

(51) Int. Cl.
| | | |
|---|---|---|
| *G01C 17/00* | (2006.01) | |
| *G01B 21/24* | (2006.01) | |
| *G01B 21/22* | (2006.01) | |

(52) U.S. Cl.
CPC ............. *G01B 21/24* (2013.01); *G01B 21/22* (2013.01)

(58) Field of Classification Search
CPC ................................ G01B 21/24; G01B 21/22
USPC ......................................................... 702/151
See application file for complete search history.

(56) References Cited

U.S. PATENT DOCUMENTS

| | | | |
|---|---|---|---|
| 6,223,114 B1 * | 4/2001 | Boros ................... | B60T 8/1708 701/1 |
| 7,562,946 B2 | 7/2009 | Leimbach et al. | |
| 9,031,771 B2 | 5/2015 | Richter et al. | |

FOREIGN PATENT DOCUMENTS

| | | |
|---|---|---|
| DE | 198 12 237 C1 | 9/1999 |
| DE | 100 65 724 A1 | 7/2002 |
| DE | 10 2008 057 027 A1 | 5/2010 |
| DE | 10 2013 013 584 A1 | 12/2013 |

OTHER PUBLICATIONS

German Search Report Corresponding to 10 2014 214 141.9 dated Jan. 23, 2015.

* cited by examiner

*Primary Examiner* — Caleb Henry
(74) *Attorney, Agent, or Firm* — Davis & Bujold PLLC; Michael J. Bujold (57) ABSTRACT

A method for determining an angle between a longitudinal axis of a first, leading component vehicle and a longitudinal axis of a second, trailing component vehicle. For at least one wheel axle or wheel axle group of the first, leading component vehicle a travel speed and/or an angular speed of the wheel axle or wheel axle group concerned is determined, and for at least one wheel axle or wheel axle group of the second, trailing component vehicle a travel speed and/or an angular speed of the wheel axle or wheel axle group concerned is determined. From the travel speeds and/or angular speeds determined for the wheel axles or wheel axle groups of the first, leading component vehicle and of the second, trailing component vehicle, the angle between the longitudinal axes of the first, leading component vehicle and the second, trailing component vehicle is then calculated.

10 Claims, 4 Drawing Sheets

METHOD AND CONTROL UNIT FOR DETERMINING AN ANGLE BETWEEN LONGITUDINAL AXES OF COMPONENT VEHICLES OF A TRACTOR-TRAILER COMBINATION

This application claims priority from German patent application serial no. 10 2014 214 141.9 filed Jul. 21, 2014.

FIELD OF THE INVENTION

The invention concerns a method for determining an angle between longitudinal axes of a tractor-trailer combination of component vehicles and a control unit for implementing the method.

BACKGROUND OF THE INVENTION

For the operation of tractor-trailer combinations consisting of a number of component vehicles, the component vehicles of which are not rigidly connected but, rather, articulated to one another by a coupling, it is important in various operating situations to know the angle enclosed by the longitudinal axes of the component vehicles of the tractor-trailer combination, for example during maneuvering, parking, starting off and braking. Until now a simple and accurate determination of such an angle between the longitudinal axes of the component vehicles of a tractor-trailer combination consisting of a number of articulated component vehicles has presented difficulties.

From DE 10 2013 013 584 A1 it is known to determine an angle between a trailer and a tractor of an articulated tractor-trailer combination by a no-contact measurement technique. For that purpose sensors are built into the trailer, these sensors being in the form of near-field radar sensors, ultrasonic sensors, light sensors or Lidar sensors.

A further method with the help of which an angle between longitudinal axes of the component vehicles of an articulated tractor-trailer combination can be determined, is known from DE 10 2008 057 027 A1. According to this a special sensor system is again used, by means of which the relative position between the component vehicles of the tractor-trailer combination can be determined. In this case the sensor system comprises two rangefinders.

SUMMARY OF THE INVENTION

Starting from there, the purpose of the present invention is to provide a new type of method for determining an angle between longitudinal axes of a tractor-trailer combination of component vehicles, as well as a control unit for implementing the method.

That objective is achieved by a method as described below.

According to the invention, for at least one wheel axle or wheel axle group of the first, leading component vehicle a travel speed and/or an angular speed of the wheel axle or wheel axle group concerned is determined, and for at least one wheel axle or wheel axle group of the second, trailing component vehicle a travel speed and/or an angular speed of the wheel axle or wheel axle group concerned is determined, and from the determined travel speeds and/or angular speeds of the wheel axles or wheel axle groups of the first, leading component vehicle and of the second, trailing component vehicle the angle between the longitudinal axes of the first, leading component vehicle and the second, rear component vehicle is calculated.

With the method according to the invention it is possible, on the basis of travel speeds and/or angular speeds of the wheel axles or wheel axle groups of the component vehicles of the vehicle tractor-trailer combination, to calculate the angle between the longitudinal axes of the component vehicles. The method according to the invention does not need any special system of sensors for determining the angle between the longitudinal axes of the component vehicles. Rather, the travel speeds and/or angular speeds of the wheel axles or wheel axle groups of the component vehicles can be determined from data which are in any case available for control purposes, in particular from wheel rotation speeds of the wheels of the respective wheel axle or wheel axle group and if necessary from a travel speed and a steering angle of a steered axle of the vehicle tractor-trailer combination.

According to a first advantageous further development of the invention the angle $\alpha$ between the longitudinal axes of the first, leading component vehicle and the second, rear component vehicle is calculated from the travel speeds and angular speeds using the following equation:

$$\tan(\alpha_i) = \frac{v_{i+1} * L_{i,K2} * \omega_i - v_i * L_{i+1,K1} * \omega_{i+1}}{v_{i+1} * v_i + L_{i,K2} * L_{i+1,K1} * \omega_{i+1} * \omega_i}$$

in which $v_{i+1}$ is the travel speed and $\omega_{i+1}$ is the angular speed of a wheel axle or wheel axle group of the first, leading component vehicle, $v_i$ is the travel speed and $\omega_i$ is the angular speed of a wheel axle or wheel axle group of the second, trailing component vehicle, $L_{i+1,K1}$ is a geometrical dimension of the first, leading component vehicle, $L_{i,K2}$ is a geometrical dimension of the second, rear component vehicle, and i is a count variable.

By using the above, generally valid equation, the travel speeds and angular speeds of axles or wheel axle groups of two adjacent, coupled component vehicles of a vehicle tractor-trailer combination can be used to compute the angle between the longitudinal axes of the component vehicles in a simple and reliable manner.

According to a second, alternative advantageous further development of the invention the angle $\alpha$ between the longitudinal axes of the first, leading component vehicle and the second, trailing component vehicle can be calculated from the angular speeds determined using the following equation:

$$\alpha = \int (\omega_{i+1} - \omega_i) dt + \alpha_0$$

in which $\omega_{i+1}$ is the angular speed of a wheel axle or wheel axle group of the first, leading component vehicle, $\omega_i$ is the angular speed of a wheel axle or wheel axle group of the second, trailing component vehicle, and $\alpha_0$ is an initialization value.

With this further development of the invention as well, the angle between the longitudinal axes of two adjacent, coupled component vehicles of a vehicle tractor-trailer combination can be computed, but this further development of the invention uses the angular speeds of the wheel axles or wheel axle groups of the component vehicles of the tractor-trailer combination exclusively, but not their travel speeds. However, an initialization value is required, which for the exact determination of the angle between the longitudinal axes of the component vehicles of the tractor-trailer combination must be known as precisely as possible and/or initialized from time to time when defined operating conditions of the tractor-trailer combination exist.

The control unit according to the invention is also described below.

BRIEF DESCRIPTION OF THE DRAWINGS

Preferred further developments emerge from the description given below. Example embodiments of the invention, to which it is not limited, are explained in greater detail with reference to the drawing, which show.

DETAILED DESCRIPTION OF THE PREFERRED EMBODIMENTS

The present invention concerns a method and a control unit for determining an angle between longitudinal axes of a tractor-trailer combination consisting of a plurality of component vehicles.

Below, the invention is described with reference to example embodiments in which the component vehicles are articulated mechanically. However, the invention can also be used when the component vehicles of a tractor-trailer combination are coupled virtually.

Figure 1:
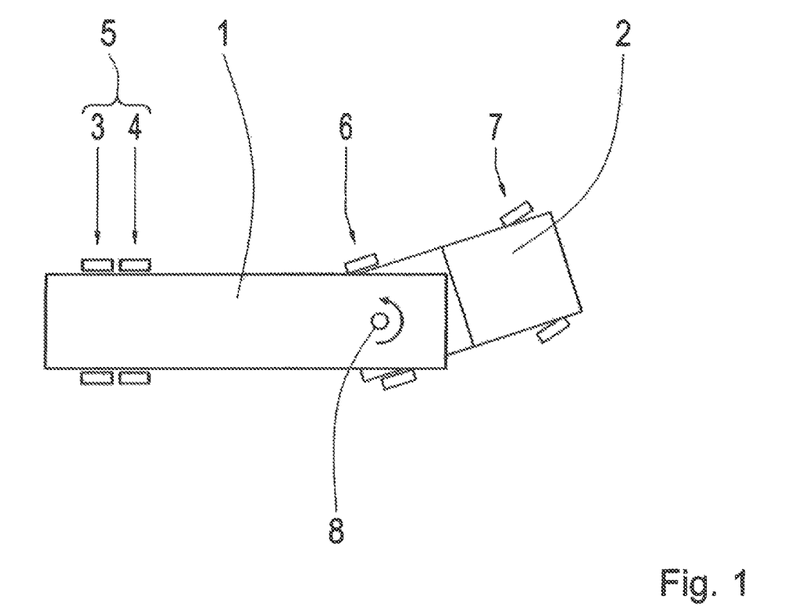
FIG. 1: A schematic representation of a first vehicle tractor-trailer combination with a plurality of component vehicles.

FIG. 1 shows a first example of a tractor-trailer combination comprising coupled component vehicles 1, 2, namely a trailing component vehicle 1 and a leading component vehicle 2. In the example embodiment shown the trailing component vehicle 1 has two non-steered and non-rotating wheel axles 3, 4, which form a wheel axle group 5. The leading component vehicle 2 has a rear wheel axle 6 and a front wheel axle 7, the rear wheel axle 6 being a non-steered and non-rotating wheel axle whereas in contrast the front wheel axle 7 of the leading component vehicle 2 is a steered and non-rotating axle. The term non-rotating wheel axle should be understood to mean a wheel axle the orientation of whose longitudinal axis relative to the longitudinal axis of the component vehicle concerned is fixed, in contrast to a drawbar axle, and can consequently not be rotated about a vertical axis.

The two component vehicles 1 and 2 are mechanically articulated to one another at a coupling point 8, so that during driving operation the orientation or relative positions of the two component vehicles can change.

Figure 2:
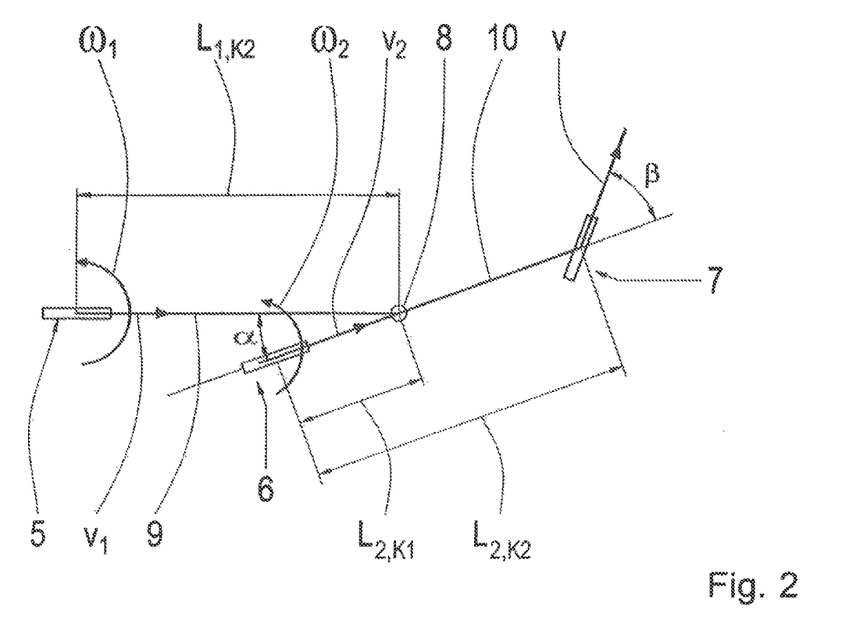
FIG. 2: A single-track model for the tractor-trailer combination shown in FIG. 1.

FIG. 2 shows a single-track model for the tractor-trailer combination of FIG. 1, wherein the two-track wheel axle group 5 and the two-track wheel axles 6, 7 are in each case reduced to a single track, namely in such manner that the virtual, single-track wheel axle group 5 lies on a longitudinal central axis 9 of the trailing component vehicle 1 and the virtual, single-track wheel axle 6 of the leading component vehicle 2 lies on a longitudinal central axis 10 thereof. The longitudinal central axes 9 and 10 of the component vehicles 1 and 2 of the tractor-trailer combination enclose an angle $\alpha$. In addition, FIG. 2 shows an angle $\beta$ that corresponds to the steering angle of the steered axle 7 of the leading component vehicle 2.

The value $v_1$ is the travel speed of the wheel axle group 5 of the trailing component vehicle 1. The value $\omega_1$ is the angular speed of this wheel axle group 5. The value $v_2$ is the travel speed of the wheel axle 6 of the leading component vehicle 2. The value $\omega_2$ is the angular speed of this wheel axle 6. The value $v$ corresponds to the travel speed of the steered wheel axle 7 of the leading component vehicle. In addition FIG. 2 shows a number of characteristic geometrical dimensions of the tractor-trailer combination represented by FIG. 1, namely the dimension $L_{1,K2}$ being the distance of the wheel axle group 5 of the trailing component vehicle 1 from the coupling point 8 of the two component vehicles 1, 2, the dimension $L_{2,K1}$ being the distance of the wheel axle 6 of the leading component vehicle 2 from the coupling point 8, and the dimension $L_{2,K2}$ being the distance between the two wheel axles 6, 7 of the leading component vehicle 2.

The tractor-trailer combination represented in FIGS. 1 and 2 can be, for example, a tractor-trailer unit with a tractor vehicle and a semi-trailer. Furthermore, the tractor-trailer combination represented in FIGS. 1 and 2 can be an articulated bus or a passenger car with a trailer.

Figure 3:
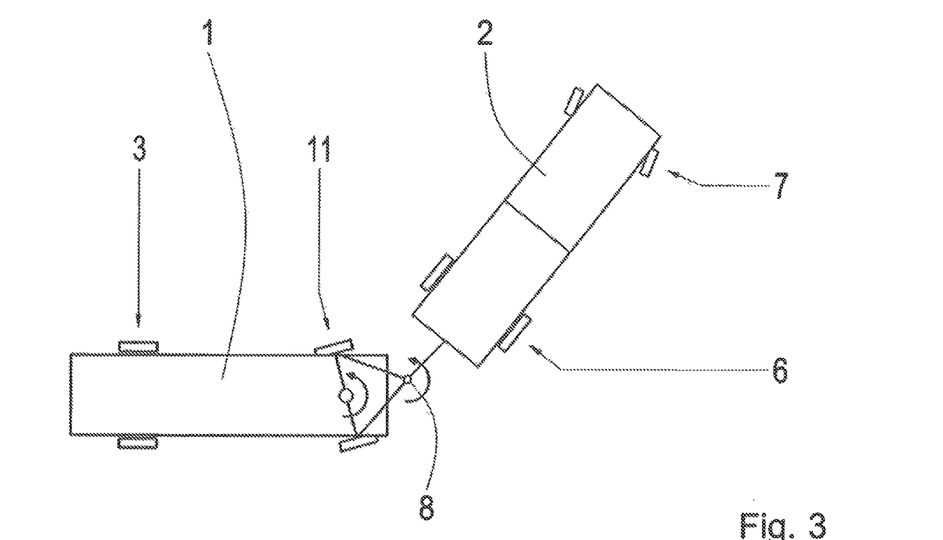
FIG. 3: A schematic representation of a second vehicle tractor-trailer combination with a plurality of component vehicles.
Figure 4:
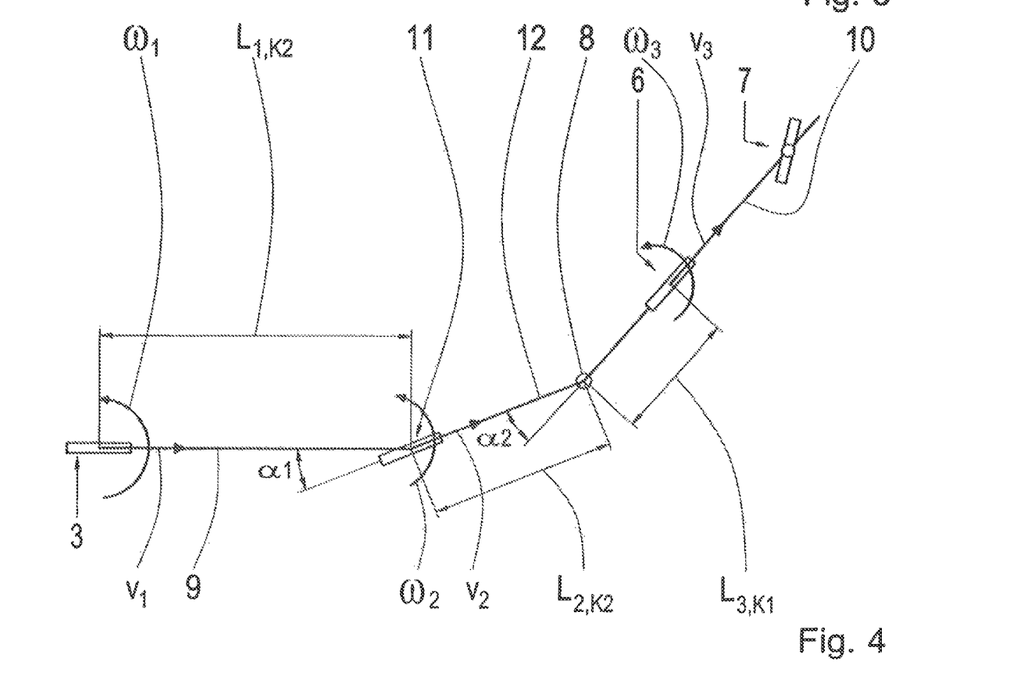
FIG. 4: A single-track model for the tractor-trailer combination shown in FIG. 3.

A further tractor-trailer combination with two mechanically articulated component vehicles 1, 2 is shown in FIG. 3, while FIG. 4 shows a single-track model for this tractor-trailer combination. In FIGS. 3 and 4 the leading component vehicle 2 again has a non-steered and non-rotating rear wheel axle 6 and a steered, non-rotating front wheel axle 7. The trailing component vehicle 1 has a rear, non-steered and non-rotating wheel axle 3 and in addition a rotatable drawbar axle 11. The two component vehicles 1, 2 are coupled to one another at the coupling point 8 by means of a so-termed drawbar of the drawbar axle 11.

It can be seen from FIG. 4 that the single-track model for the tractor-trailer combination of FIG. 3 has two significant angles $\alpha_1$ and $\alpha_2$, namely the angle $\alpha_1$ between the longitudinal central axis 9 of the trailing component vehicle 1 and the drawbar axis 12 of the drawbar, and the angle $\alpha_2$ between the drawbar axis 12 and the longitudinal central axis 10 of the leading component vehicle 2. In FIG. 4 the values $v_1$ and $\omega_1$ are, respectively, the travel speed and angular speed of the wheel axle 3 of the trailing component vehicle 1. The values $v_3$ and $\omega_3$ are the travel speed and angular speed of the rear wheel axle 6 of the leading component vehicle 2. The values $v_2$ and $\omega_2$ are the travel speed and angular speed of the drawbar axle 11. In FIG. 4 the geometrical dimension $L_{1,K2}$ corresponds to the distance between the rear wheel axle 3 and the front drawbar axle 11 of the trailing component vehicle 1. The dimension $L_{2,K2}$ corresponds to the distance between the drawbar axle 11 and the coupling point 8. The dimension $L_{3,K1}$ corresponds to the distance between the coupling point 8 and the rear wheel axle 6 of the leading component vehicle 2.

The tractor-trailer combination in FIGS. 3 and 4 can for example be a tractor-trailer combination of a truck and a trailer with a drawbar, or a tractor-trailer combination of an agricultural tractor and an agricultural trailer with a drawbar.

Figure 5:
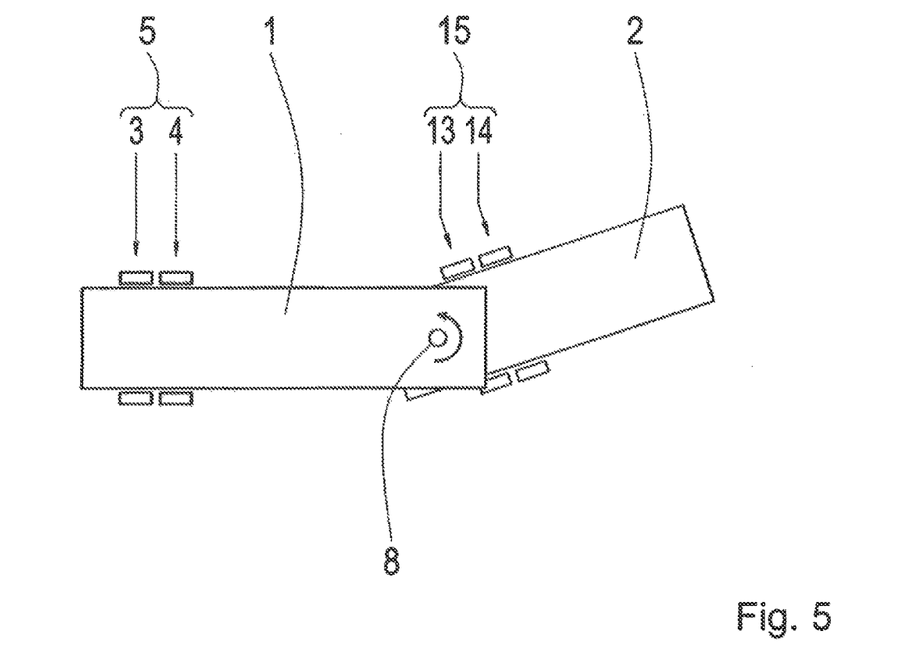
FIG. 5: A schematic representation of a third vehicle tractor-trailer combination with a plurality of component vehicles.

FIG. 5 shows a further tractor-trailer combination of two component vehicles 1, 2 coupled at a coupling point 8, such that in FIG. 5 the trailing component vehicle 1 has two non-steered, non-rotating wheel axles 3, 4 that form a wheel axle group 5, and such that the leading component vehicle 2 as well has two non-steered, non-rotating wheel axles 13, 14 that form a wheel axle group 15. The tractor-trailer combination in FIG. 5 can for example consist of two coupled trailers, so that the leading trailer 2 can then be coupled to a tractor vehicle (not shown).

Figure 6:
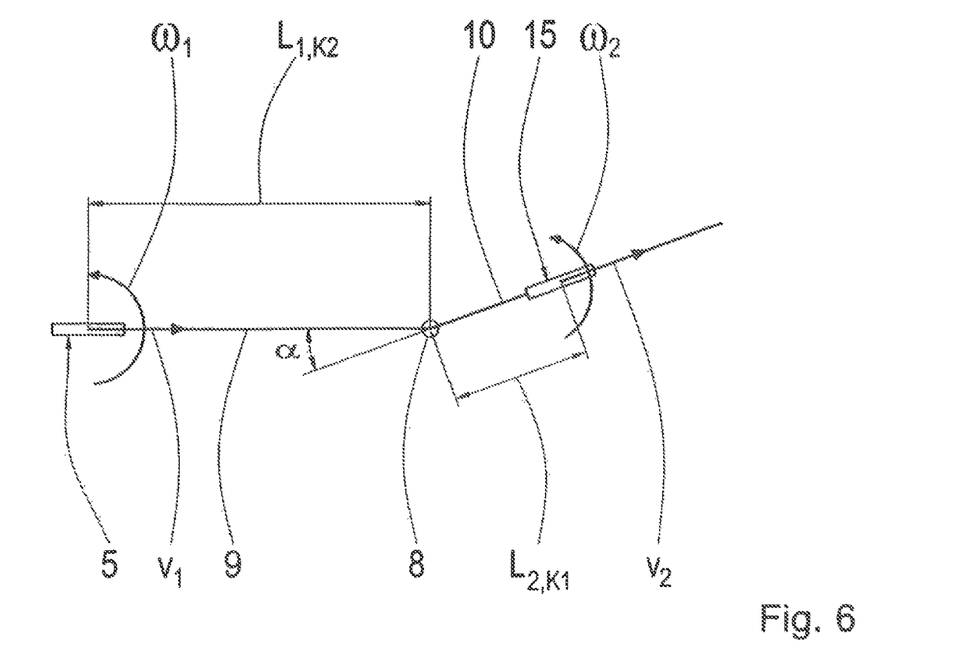
FIG. 6: A single-track model for the tractor-trailer combination shown in FIG. 5.

FIG. 6 shows the single-track model for the tractor-trailer combination in FIG. 5, wherein the longitudinal central axes 9, 10 of the two component vehicles 1, 2 again enclose an angle α. The values $v_1$ and $\omega_1$ are, respectively, the travel speed and the angular speed of the wheel axle group 5, whereas the values $\omega_2$ and $v_2$ are, respectively, the angular speed and the travel speed of the wheel axle group 15. The geometrical dimension $L_{1,K2}$ corresponds to the distance between the wheel axle group 5 of the trailing component vehicle 1 and the coupling point 8, whereas the geometrical dimension $L_{2,K1}$ corresponds to the distance between the coupling point 8 and the wheel axle group 15 of the leading component vehicle 2.

Figure 7:
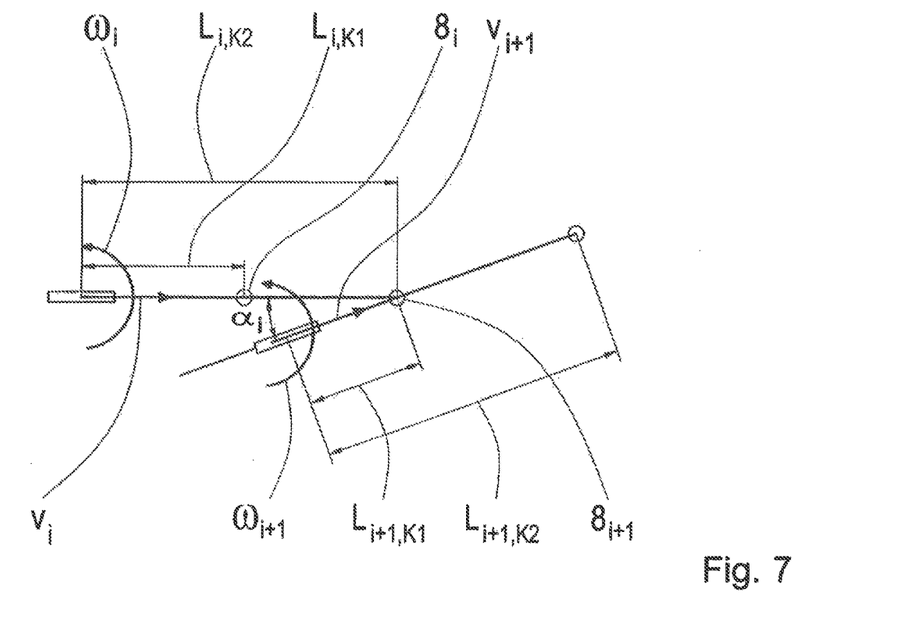
FIG. 7: A generalized single-track model for tractor-trailer combinations having a plurality of component vehicles.

FIG. 7 shows an abstracted, generalized single-track model for a tractor-trailer combination of mechanically or virtually coupled component vehicles, such that the model of FIG. 7 is used twice in the model of FIG. 4, namely on the one hand to determine the angle $\alpha_1$ between the longitudinal central axis 9 of the trailing component vehicle 1 and the drawbar axis 12, and on the other hand to determine the angle $\alpha_2$ between the drawbar axis 12 and the longitudinal central axis 10 of the leading component vehicle 2. In the abstracted, generalized single-track model shown in FIG. 7 the travel speeds v, angular speeds ω and geometrical dimensions L of the trailing component vehicle are characterized by the subscript index i and the travel speeds, angular speeds and geometrical dimensions of the leading component vehicle are characterized by the subscript index i+1. Furthermore, in the generalized single-track model of FIG. 7 it is assumed that both on the trailing component vehicle and also on the leading component vehicle there are respective coupling points $8_i$ and $8_{i+1}$.

In order, now, to determine the angle between the longitudinal axes of the coupled component vehicles of a tractor-trailer combination, namely by using the abstract single-track model in FIG. 7, for at least one wheel axle and/or wheel axle group of the leading component vehicle concerned a travel speed $v_{i+1}$ and an angular speed $\omega_{i+1}$ of the wheel axle or wheel axle group concerned are determined. In addition, for at least one wheel axle or wheel axle group of the trailing component vehicle a travel speed $v_i$ and an angular speed $\omega_i$ of the wheel axle or wheel axle group concerned are determined. From these determined travel speeds $v_i$ and $v_{i+1}$ and angular speeds $\omega_i$ and $\omega_{i+1}$ of the wheel axles or wheel axle groups of the leading and trailing component vehicles, the angle α between the longitudinal axes of the component vehicles is then calculated.

For this, the angle α between the longitudinal axes of the component vehicles is calculated as a function of the travel speeds $v_i$ and $v_{i+1}$ and angular speeds $\omega_i$ and $\omega_{i+1}$ determined, with reference to the generalized single-track model of FIG. 7, using the following equation:

$$\tan(\alpha_i) = \frac{v_{i+1} * L_{i,K2} * \omega_i - v_i * L_{i+1,K1} * \omega_{i+1}}{v_{i+1} * v_i + L_{i,K2} * L_{i+1,K1} * \omega_{i+1} * \omega_i}$$

in which $v_{i+1}$ is the travel speed and $\omega_{i+1}$ the angular speed of a wheel axle or wheel axle group of the first, leading component vehicle, $v_i$ is the travel speed and $\omega_i$ is the angular speed of a wheel axle or a wheel axle group of the second, trailing component vehicle, $L_{i+1,K1}$ is a geometrical dimension of the first, leading component vehicle, $L_{i,K2}$ is a geometrical dimension of the second, trailing component vehicle, and i is a count variable.

If the generalized single-track model and the above equation are applied in the special case of FIGS. 1 and 2, namely for a tractor-trailer combination with no drawbar consisting of the leading component vehicle 2 and the trailing component vehicle 1, wherein the leading component vehicle 2 has the front, non-rotating but steered wheel axle 7 and the rear, non-rotating and non-steered wheel axle 8, and wherein the trading component vehicle 1 has exclusively the non-rotating and non-steered wheel axle group 5, then the index i=1 in the above generalized formula for the generalized single-track model shown in FIG. 7, and the angle α between the longitudinal axes 9 and 10 of the two component vehicles 1 and 2 is calculated from the following equations:

$$\alpha = \alpha_1$$

$$\tan(\alpha_1) = \frac{v_2 * L_{1,K2} * \omega_1 - v_1 * L_{2,K1} * \omega_2}{v_2 * v_1 + L_{1,K2} * L_{2,K1} * \omega_2 * \omega_1}$$

in which $v_2$ is the travel speed and $\omega_2$ is the angular speed of the rear wheel axle or wheel axle group of the leading component vehicle, $v_1$ is the travel speed and $\omega_1$ is the angular speed of the wheel axle or wheel axle group of the trailing component vehicle, $L_{2,K1}$ is the distance between the rear wheel axle or wheel axle group and the coupling point 8 of the two component vehicles, and $L_{1,K2}$ is the distance between the wheel axle or wheel axle group of the trailing component vehicle and the coupling point 8 of the two component vehicles.

If the generalized equation for the single-track model in FIG. 7 is applied in the special case, shown in FIG. 3, of a tractor-trailer combination of the two component vehicles 1 and 2 coupled by way of a drawbar axle 11 of the trailing component vehicle 1, in which the drawbar axle 11 is the front axle of the trailing component vehicle 1 and in which the trailing component vehicle 1 comprises the rear, non-steered and non-rotating wheel axle 3 and the leading component vehicle 2 comprises the rear, non-steered and non-rotating wheel axle 6, then the index i=2 and the angle α between the longitudinal axes 9 and 10 of the tractor-trailer combination in FIGS. 3 and 4 can be calculated using the following equations:

$$\alpha = \alpha_1 + \alpha_2$$

$$\tan(\alpha_1) = \frac{v_2 * L_{1,K2} * \omega_1}{v_2 * v_1}$$

$$\tan(\alpha_2) = \frac{v_3 * L_{2,K2} * \omega_2 + v_2 * L_{3,K1} * \omega_3}{v_3 * v_2 - L_{1,K2} * L_{3,K1} * \omega_3 * \omega_2}$$

in which $\alpha_1$ is the angle between the longitudinal axis of the trailing component vehicle and the drawbar axis, and $\alpha_2$ is the angle between the drawbar axis and the longitudinal axis of the leading component vehicle, $v_3$ is the travel speed and $\omega_3$ is the angular speed of the rear wheel axle or wheel axle group of the leading component vehicle, $v_2$ is the travel speed and $\omega_2$ is the angular speed of the drawbar axle, $v_1$ is the travel speed and $\omega_1$ is the angular speed of the wheel axle or wheel axle group of the trailing component vehicle, $L_{1,K2}$ is the distance between the rear wheel axle or wheel axle group of the trailing component vehicle and the drawbar axle, $L_{2,K2}$ is the distance between the drawbar axle and the coupling point of the two component vehicles, and $L_{3,K1}$ is the distance between the rear wheel axle or wheel axle group of the leading component vehicle and the coupling point of the two component vehicles.

In the tractor-trailer combination shown in FIGS. 5 and 6 as well, in the manner described above the angle $\alpha$ between the longitudinal axes of the component vehicles 9 and 10 of the tractor-trailer combination in FIGS. 5 and 6 can be calculated from the travel speeds and angular speeds of the wheel axle groups 5 and 15; in this case the index i=1 and the following equations are used:

$$\alpha = \alpha_1$$
$$\tan(\alpha_1) = \frac{v_2 * L_{1,K2} * \omega_1 + v_1 * L_{2,K1} * \omega_2}{v_2 * v_1 - L_{1,K2} * L_{2,K1} * \omega_2 * \omega_1}$$

In the above equations, used to determine the angle between coupled component vehicles of a tractor-trailer combination, the respective travel speeds and angular speeds of wheel axles or wheel axle groups are involved. In this case the travel speed of a wheel axle or wheel axle group or drawbar axle of a component vehicle is determined from the wheel speeds of the wheels of the wheel axle or wheel axle group or drawbar axle concerned, in accordance with the following equation:

$$v_i = \frac{1}{N} \sum_{j=1}^{N} v_{i-RAD,j}$$

in which $v_i$ is the travel speed of the wheel axle or wheel axle group or drawbar axle, and $v_{i-RAD_j}$ is the wheel speed of the j-th wheel of the wheel axle or wheel axle group or drawbar axle.

Thus, in this way the wheel speeds of all the wheels on a wheel axle or wheel axle group are averaged in order to determine the travel speed of the wheel axle or wheel axle group or drawbar axle concerned. The wheel speeds of all the wheels on a wheel axle or wheel axle group or drawbar axle are preferably calculated from measured wheel rotation speed values of the wheels on a wheel axle or wheel axle group or drawbar axle.

The angular speed of a wheel axle or wheel axle group or drawbar axle of a component vehicle is determined from the wheel speeds of the wheels of the wheel axle or wheel axle group or drawbar axle concerned, preferably in accordance with the following equation:

$$\omega_i = \frac{v_{i-RAD,RECHTS} - v_{i-RAD,LINKS}}{d}$$

in which $\omega_i$ is the angular speed of the wheel axle or wheel axle group or drawbar axle concerned, $v_{i-RAD,RECHTS}$ and $v_{i-RAD,LINKS}$ are wheel speeds of a right and a left wheel on the wheel axle or wheel axle group or drawbar axle, and d is the distance between the left and right wheels of the wheel axle or wheel axle group or drawbar axle.

In the case of a wheel axle group having several left and right wheels, the wheel speeds of the left wheel and the right wheel are in each case the wheel speeds determined for all the left wheels and all the right wheels of the wheel axle group concerned.

If, for example for the tractor-trailer combination shown in FIGS. 1 and 2 or, for that matter, the tractor-trailer combination shown in FIGS. 3 and 4, no wheel speeds of the wheels on the rear wheel axle 6 of the leading component vehicle 2 are available, the travel speed and the angular speed of the rear axle 6 of the leading component vehicle 2 can be calculated from the steering angle $\beta$ and the travel speed v of the steered front axle 7 of the leading component vehicle 2, for the tractor-trailer combination in FIGS. 1 and 2 preferably using the following equation:

$$\begin{pmatrix} v_2 \\ \omega_2 \end{pmatrix} = \begin{pmatrix} v * \cos(\beta) \\ \dfrac{v * \sin(\beta)}{L_{2,K2}} \end{pmatrix}$$

If an appropriate sensor system is present in the tractor-trailer combination, the travel speeds and angular speeds of the wheel axles, wheel axle groups or drawbar axles calculated as above can be further verified, for example from speeds derived from radar or GPS measurements, or angular speeds determined with the help of yaw-rate sensors. However, that is purely optional: the invention can also be used without any additional sensors to determine the angle between longitudinal axes of the component vehicles of a tractor-trailer combination.

According to an alternative design of the invention it is provided that the angle between the longitudinal axes of component vehicles of a tractor-trailer combination can be determined exclusively on the basis of angular speeds of the wheel axles, wheel axle groups or drawbar axles, preferably using the following equation:

$$\alpha = \int (\omega_{i+1} - \omega_i) dt + \alpha_0$$

in which $\omega_{i+1}$ is the angular speed of a wheel axle or wheel axle group of the first, leading component vehicle, $\omega_i$ is the angular speed of a wheel axle or wheel axle group of the second, trailing component vehicle and $\alpha_0$ is an initialization value.

In this case, to avoid an integration error it is important to have as precise a knowledge as possible of the initialization value $\alpha_0$. The initialization value $\alpha_0$ corresponds to that angle between the longitudinal axes of the component vehicles which they enclose at the beginning of the numerical integration in accordance with the above equation.

In order to determine this initialization value $\alpha_0$ as accurately as possible, it can be provided that the initialization value $\alpha_0$ is determined afresh from time to time under particular operating conditions.

For example, it can be provided that when, for example on the basis of GPS information it is known that the tractor-trailer combination is operating on a straight stretch of road and when, furthermore, the time span during which the vehicle drives on the straight stretch is longer than a limit value, the initialization value $\alpha_0$ is set to zero. The limit value for the time span depends on the total length of the tractor-trailer combination and its travel speed, and can for example be determined from the following equation:

$$T = \frac{k * l}{v}$$

in which T is the limit value for the time span concerned, l is the total length of the tractor-trailer combination, v is the speed of the tractor-trailer combination and k is a constant, such that k can for example equal 3.

Alternatively, when for a defined time span the steering angle β=0, it can be assumed that the tractor-trailer combination is operating on a straight stretch, and then the initialization value $\alpha_0$ is again set to zero.

The present invention also concerns a control unit for implementing the method. The control unit comprises means for carrying out the method according to the invention. The means include both hardware means and software means. The hardware means are data interfaces in order to exchange data with the assemblies involved in implementing the method according to the invention. In addition, the hardware means include a processor and a memory, the memory serving to store data and the processor serving for data processing. The software means consist of program modules for implementing the method according to the invention.

INDEXES

1 Component vehicle
2 Component vehicle
3 Wheel axle
4 Wheel axle
5 Wheel axle group
6 Wheel axle
7 Wheel axle
8 Coupling point
9 Longitudinal axis
10 Longitudinal axis
11 Drawbar axle
12 Longitudinal axis
13 Wheel axle
14 Wheel axle
15 Wheel axle group

The invention claimed is:

1. A method for determining an angle between longitudinal axes of a tractor-trailer combination having a first, leading component vehicle including at least one wheel axle or wheel axle group, and a second, trailing component vehicle including at least one wheel axle or wheel axle group, each of the first, leading component vehicle and the second, trailing component vehicle defining a respective longitudinal axis, the method comprising the steps of:
coupling the first, leading component vehicle and the second, trailing component vehicle at a coupling point such that the longitudinal axes of the first, leading component vehicle and the second trailing component vehicle are pivotable with respect to each other at the coupling point;
determining, with a control unit, for the wheel axle or wheel axle group of the first, leading component vehicle, a travel speed and an angular speed of the wheel axle or the wheel axle group of the first, leading component vehicle;
determining, with the control unit, for the wheel axle or wheel axle group of the second, trailing component vehicle, a travel speed and an angular speed of the wheel axle or the wheel axle group of the second, trailing component vehicle;
calculating, with a processor, from the travel speeds and the angular speeds of the wheel axles or the wheel axle groups determined for the first, leading component vehicle and the second, trailing component vehicle, the angle between the longitudinal axes of the first, leading component vehicle and the second, trailing component vehicle; and
operating the tractor-trailer combination with a knowledge of the angle between the longitudinal axes of the first, leading component vehicle and the second, trailing component vehicle.

2. The method according to claim 1, further comprising the step of calculating, with the processor, the angle α between the longitudinal axes of the first, leading component vehicle and the second, trailing component vehicle from the determined travel speeds and the angular speeds of the wheel axles or the wheel axle groups of the first, leading and the second, trailing component vehicles, using an equation of:

$$\tan(\alpha_i) + \frac{vi+1*Li, K2*\omega i - vi*Li+1, K1*\omega i+1}{v_{i+1}*v_i + L_{i,K2}*L_{i+1,K1}*\omega_{i+1}*\omega_i}$$

in which $v_{i+1}$ is the travel speed and $\omega_{i+1}$ is the angular speed of the wheel axle or the wheel axle group of the first, leading component vehicle,
$v_i$ is the travel speed and $\omega_i$ is the angular speed of the wheel axle or the wheel axle group of the second, trailing component vehicle,
$L_{i+1,K1}$ is a geometrical dimension from the coupling point to the wheel axle or the wheel axle group of the first, leading component vehicle, the coupling point being a point at which the first, leading component vehicle is pivotally coupled to the second, rear component vehicle,
$L_{i,K2}$ is a geometrical dimension from the coupling point to the wheel axle or the wheel axle group of the second, rear component vehicle, and
i is a count variable.

3. The method according to claim 2, wherein in a case of a tractor-trailer combination of two component vehicles having a first, leading component vehicle having a front, non-rotating and steered wheel axle and a rear, non-rotating and non-steered wheel axle or wheel axle group, and a second, trailing component vehicle having exclusively a non-rotating and non-steered wheel axle or wheel axle group, the method further comprising defining the count variable i as being equal to 1, and calculating, with the processor, the angle α between the longitudinal axes of the first, leading component vehicle and the second, trailing component vehicle from the following equations of:

$$\alpha = \alpha_1$$

$$\tan(\alpha_1) = \frac{v_2*L_{1,K2}*\omega_1 - v_1*L_{2,K1}*\omega_2}{v_2*v_1 + L_{1,K2}*L_{2,K1}*\omega_2*\omega_1}$$

in which $v_2$ is the travel speed and $\omega_2$ is the angular speed of the rear wheel axle or the wheel axle group of the leading component vehicle,
$v_1$ is the travel speed and $\omega_1$ is the angular speed of the rear wheel axle or the wheel axle group of the second, trailing component vehicle,
$L_{2,K1}$ is a distance of the rear wheel axle or the wheel axle group of the leading component vehicle from the coupling point of the two component vehicles, and
$L_{1,K2}$ is a distance of the rear wheel axle or the wheel axle group of the second, trailing component vehicle from the coupling point of the two component vehicles.

4. The method according to claim 2, wherein in a case of a tractor-trailer combination of two component vehicles having a first, leading component vehicle with a front, non-rotating and steered wheel axle and a rear, non-rotating and non-steered wheel axle or wheel axle group, and a second, trailing component vehicle with a rear, non-rotating and non-steered wheel axle or wheel axle group and a pivotable drawbar axle being pivotably fixed at an axle pivot point to a lead end of the second, trailing component vehicle and pivotably fixed, via the coupling point, to the first, leading component vehicle, the method further comprising defining the count variable i as being equal to 2, and calculating, with the processor, the angle α between the longitudinal axes of the first, leading component vehicle and the second, trailing component vehicle from the following equations:

$$\alpha = \alpha_1 = \alpha_2$$
$$\tan(\alpha_1) = \frac{v_2 * L_{1,K2} * \omega_1}{v_2 * v_1}$$
$$\tan(\alpha_2) = \frac{v_3 * L_{2,K2} * \omega_2 + v_2 * L_{3,K1} * \omega_3}{v_3 * v_2 - L_{1,K2} * L_{3,K1} * \omega_3 * \omega_2}$$

in which $\alpha_1$ is the angle between the longitudinal axis of the second, trailing component vehicle and an axis extending perpendicular to the drawbar axle and $\alpha_2$ is the angle between the axis extending perpendicular to the drawbar axle and the longitudinal axis of the first, leading component vehicle, $v_3$ is the travel speed and $\omega_3$ is the angular speed of the rear wheel axle or the wheel axle group of the first, leading component vehicle, $v_2$ is the travel speed and $\omega_2$ is the angular speed of the axis extending perpendicular to the drawbar axle, $v_1$ is the travel speed and $\omega_1$ is the angular speed of the wheel axle or the wheel axle group of the second, trailing component vehicle, $L_{1,K2}$ is a distance of the rear wheel axle or the wheel axle group of the second, trailing component vehicle from the axle pivot point of the drawbar axle, $L_{2,K2}$ is a distance of the axle pivot point of the drawbar axle from the coupling point of the two component vehicles, and $L_{3,K1}$ is a distance of the rear wheel axle or the wheel axle group of the first, leading component vehicle from the coupling point of the two component vehicles.

5. The method according to claim 1, further comprising, with regard to the determined travel speeds and the determined angular speeds, calculating, with the processor, the angle α between the longitudinal axes of the first, leading component vehicle and the second, trailing component vehicle exclusively from the determined angular speeds, using an equation:

$$\alpha = \int(\omega_{i+1} - \omega_i)dt + \alpha_0$$

in which $\omega_{i+1}$ is the angular speed of the wheel axle or the wheel axle group of the first, leading component vehicle, $\omega_i$ is the angular speed of the wheel axle or the wheel axle group of the second, trailing component vehicle, and $\alpha_0$ is an initialization value.

6. The method according to claim 1, further comprising determining, with the processor, the travel speed and the angular speed of at least one of the wheel axle or the wheel axle group of the component vehicles and of a drawbar axle from wheel speeds of wheels on the wheel axle or the wheel axle group or the drawbar axle concerned, the drawbar axle being pivotably fixed at an axle pivot point to a lead end of the second, trailing component vehicle and pivotably fixed, via the coupling point, to the first, leading component vehicle, the wheel speeds of the wheels concerned being determined from wheel rotation speeds of the wheels.

7. The method according to claim 6, further comprising determining, with the processor, the travel speed of the wheel axle or the wheel axle group or the drawbar axle from the wheel speeds of the wheels on the wheel axle or the wheel axle group or the drawbar axle concerned, in accordance with the following equation:

$$v_i = \frac{1}{N}\sum_{j=1}^{N} v_{i\text{-}RAD,j}$$

in which $v_i$ is the travel speed of the wheel axle or the wheel axle group or the drawbar axle, and $v_{i\text{-}RAD,j}$ is the wheel speed of the j-th wheel of the wheel axle or the wheel axle group or the drawbar axle.

8. The method according to claim 6, further comprising determining, with the processor, the angular speed of the wheel axle or the group of wheel axles or the drawbar axle of a component vehicle from the wheel speeds of the wheels on the wheel axle or the group of wheel axles or the drawbar axle concerned, in accordance with the following equation:

$$\omega_i = \frac{v_{i\text{-}RAD,RECHTS} - v_{i\text{-}RAD,LINKS}}{d}$$

in which $\omega_i$ is the angular speed of the wheel axle or the group of wheel axles or the drawbar axle, $v_{i\text{-}RAD,RECHTS}$ and $v_{i\text{-}RAD,LINKS}$ are the wheel speeds of a right and a left wheel of the wheel axle or the wheel axle group or the drawbar axle, and d is a distance between the left and the right wheels of the wheel axle or the wheel axle group or the drawbar axle.

9. The method according to claim 1, further comprising determining, with the processor, the travel speed and the angular speed of a rear wheel axle or a rear wheel axle group of the first, leading component vehicle from a steering angle and a travel speed of a front wheel axle of the first, leading component vehicle.

10. A control unit comprising a means for implementing a method of determining an angle between longitudinal axes of a tractor-trailer combination having a first, leading component vehicle including at least one wheel axle or wheel axle group, and a second, trailing component vehicle including at least one wheel axle or wheel axle group, each of the first, leading component vehicle and the second, trailing component vehicle defining a respective longitudinal axis, the first, leading component vehicle and the second, trailing component vehicle being coupled at a coupling point such that the longitudinal axes of the first, leading component vehicle and the second, trailing component vehicle are pivotable with respect to each other at the coupling point, the means comprising a processor, a memory and a first assembly for determining a travel speed and an angular speed of a wheel axle or a wheel axle group of a first, leading component vehicle, and a second assembly for determining a travel speed and an angular speed of a wheel axle or a wheel axle group of a second, trailing component vehicle, and the first and the second assemblies communicating with the processor which calculates an angle between longitudinal axes of the first, leading and the second, trailing component vehicles, the method implemented by the means including: determining, with the control unit, the travel speed and the angular speed of the wheel axle or the wheel axle group of the first, leading component vehicle; determining, with the control unit, the travel speed and the angular speed of the wheel axle or the wheel axle group of the second, trailing component vehicle; and calculating, with the processor, the angle between the longitudinal axes of the first, leading component vehicle and the second, trailing component vehicle from the determined at least one of the travel speeds and the angular speeds of the wheel axles or the wheel axle groups of the first, leading component vehicle and the second, trailing component vehicle; and operating the tractor-trailer combination with a knowledge of the angle between the longitudinal axes of the first, leading component vehicle and the second, trailing component vehicle.

* * * * *